(12) United States Patent
Liu

(10) Patent No.: US 12,486,118 B1
(45) Date of Patent: Dec. 2, 2025

(54) TRANSPORT EQUIPMENT WITH CLEANING CAPABILITIES

(71) Applicant: Moutai Institute, Zunyi (CN)

(72) Inventor: Yaxi Liu, Zunyi (CN)

(73) Assignee: Moutai Institute, Zunyi (CN)

( * ) Notice: Subject to any disclaimer, the term of this patent is extended or adjusted under 35 U.S.C. 154(b) by 0 days.

(21) Appl. No.: 19/259,679

(22) Filed: Jul. 3, 2025

(30) Foreign Application Priority Data

Jan. 6, 2025 (CN) .......................... 202510012949.1

(51) Int. Cl.
| | | |
|---|---|---|
| *B65G 45/14* | (2006.01) | |
| *B65G 45/18* | (2006.01) | |
| *B65G 45/22* | (2006.01) | |
| *B65G 45/24* | (2006.01) | |
| *B65G 45/26* | (2006.01) | |

(52) U.S. Cl.
CPC ............. *B65G 45/14* (2013.01); *B65G 45/18* (2013.01); *B65G 45/22* (2013.01); *B65G 45/24* (2013.01); *B65G 45/26* (2013.01)

(58) Field of Classification Search
CPC ........ B65G 45/14; B65G 45/18; B65G 45/22; B65G 45/24; B65G 45/26
USPC .......................................................... 198/499
See application file for complete search history.

(56) References Cited

U.S. PATENT DOCUMENTS

| | | | | |
|---|---|---|---|---|
| 5,421,448 | A * | 6/1995 | Falcioni | B65G 45/14 |
| | | | | 198/498 |
| 5,649,616 | A * | 7/1997 | Stecklow | B65G 45/24 |
| | | | | 198/496 |
| 9,718,626 | B2 * | 8/2017 | Urban | B65G 45/16 |
| 10,046,919 | B1 * | 8/2018 | Stenvik | B65G 15/28 |
| 11,034,526 | B2 * | 6/2021 | Schulte Strathaus | B65G 45/16 |
| 11,634,284 | B1 * | 4/2023 | Reyes | B65G 45/14 |
| | | | | 198/496 |
| 2019/0084773 | A1 * | 3/2019 | Handy | B65G 45/22 |

(Continued)

FOREIGN PATENT DOCUMENTS

| | | |
|---|---|---|
| CN | 216234578 U | 4/2022 |
| CN | 216334810 U | 4/2022 |
| CN | 118790706 A | 10/2024 |

OTHER PUBLICATIONS

Chinese Patent CN 1191606611 (Year: 2024).*

*Primary Examiner* — Mark A Deuble
(74) *Attorney, Agent, or Firm* — DINSMORE & SHOHL LLP

(57) ABSTRACT

A transport equipment with cleaning capabilities includes a support rack having rotatably conveying rollers; a conveyor belt arranged around the conveyor rollers and driven thereby for conveying; and a cleaning mechanism integrally arranged on one side of the support rack. During a single operational cycle of circulative conveying, the cleaning mechanism performs repeated and alternate cleaning actions and scraping actions on the conveyor belt simultaneously, and impurities removed from the conveyor belt are collected in the cleaning mechanism. According to the present disclosure, during the conveying, surface cleaning treatment can be performed on the conveyor belt through the cleaning mechanism. The cleaning mechanism avoids interfering with the support rack or other components. The removed impurities are collected in the cleaning mechanism and prevented from falling on the support rack, and hence not creating impurity residual.

8 Claims, 5 Drawing Sheets

(56) References Cited

U.S. PATENT DOCUMENTS

| | | | |
|---|---|---|---|
| 2019/0344973 A1* | 11/2019 | Rogan | B65G 45/26 |
| 2023/0312266 A1* | 10/2023 | Van Blokland | B65G 45/26 |
| | | | 198/498 |
| 2024/0208740 A1* | 6/2024 | Wyatt | B65G 45/22 |

* cited by examiner though this application claims priority from Chinese Application No. 202510012949.1, filed on Jan. 6, 2025, the content of which is incorporated herein.

TRANSPORT EQUIPMENT WITH CLEANING CAPABILITIES

CROSS-REFERENCE TO RELATED APPLICATION

This application claims priority from Chinese Application No. 202510012949.1, filed on Jan. 6, 2025, the content of which is incorporated herein.

FIELD OF THE INVENTION

The present disclosure relates to the field of transport equipment, and in particular, to a transport equipment with cleaning capabilities.

BACKGROUND OF THE INVENTION

Transport equipment are extensively utilized across various fields. Within food production lines, these transport equipment are often used to interconnect operations of two successive procedures. For example, transport equipment are essential for the process of distilled grain brewing. The distilled grains, a by-product generated in a brewing process and also known as lees or dregs, mainly consist of residual yeast left after fermentation, unfermented sugars, alcohol, and some solid substances, and are generally generated during brewing of beer, wine, etc.

In a process of conveying the distilled grains, residual grain liquid and rice particles tend to adhere to the conveyor belt, with further potential attachment to a surface of a conveyor roller during conveying, thereby contaminating the distilled grains. Thus, the conveyor belt needs to be cleaned. In prior art transport equipment for the distilled grains, a scraping plate is arranged on the conveyor belt to scrape off residual distilled grain stains or impurities. Then, the conveyor belt is brushed through a cleaning brush. However, the significant spatial separation between the scraping plate and cleaning brush results in delayed brush contact after scraping, allowing residual deposits to dry. Moreover, the brush and the scraping plate generally perform cleaning only once in a single operational cycle, which proves insufficient for achieving optimal cleanliness. In addition, structural constraints requiring avoidance of scraping plates and brushes of some devices lead to stains removed by the brush or the scraping plate being left in the corner junctions of device frames, creating bacterial growth risks detrimental to sanitary conditions.

SUMMARY OF THE INVENTION

According to transport equipment with cleaning capabilities of the present disclosure, the problem that an existing transport equipment fails to ensure effective maintenance of sanitary conditions during conveyor belt operation can be effectively solved.

In one aspect, the present disclosure provides a transport equipment with cleaning capabilities. The transport equipment comprises:
  a support rack, where a conveyor roller is rotatably arranged on the support rack;
  a conveyor belt, where the conveyor belt is arranged around the conveyor roller, and driven by the conveyor roller for conveying; and
  a cleaning mechanism, where the cleaning mechanism is integrally arranged on one side of the support rack.

In a case where the conveyor belt performs one-time circulative conveying, the cleaning mechanism executes repeated and alternate cleaning actions and scraping actions on the conveyor belt simultaneously, and impurities removed from the conveyor belt are collected in the cleaning mechanism.

The cleaning mechanism comprises:
  a water collection frame, where the water collection frame is arranged on one side of the support rack;
  a plurality of scraping apparatuses, where the plurality of scraping apparatuses are arranged on the water collection frame, and used to scrape a surface of the conveyor belt; and
  a plurality of cleaning rollers, where the plurality of cleaning rollers are rotatably arranged on the water collection frame, and abutting against the conveyor belt, so as to clean the surface of the conveyor belt in a rolling manner.

In a conveying direction of the conveyor belt, the plurality of scraping apparatuses and the cleaning rollers are arranged adjacent to each other and distributed alternately, and the impurities removed from the conveyor belt by the scraping apparatuses and the cleaning rollers are collected in the water collection frame. Thus, the removed impurities are collected through the water collection frame. The scraping action is implemented through the scraping apparatus, and the cleaning action is implemented through the cleaning roller. A cleaning structure is integrated in the water collection frame, and thus is unlikely to interfere with other components.

In some embodiments, the scraping apparatus comprises:
  a reciprocating screw rod, where the reciprocating screw rod is rotatably arranged on the water collection frame;
  a limiting slide rod, where the limiting slide rod is arranged on the water collection frame and adjacent to the reciprocating screw rod; and
  a plurality of drive blocks, where the plurality of drive blocks are movably arranged on the reciprocating screw rod and the limiting slide rod, and provided with scraping plates.

The reciprocating screw rod rotates to drive the drive blocks to move along the limiting slide rod, enabling the scraping plate to scrape the surface of the conveyor belt.

A movement direction of the scraping plate is perpendicular to the conveying direction of the conveyor belt.

The scraping plate is provided with a scraping surface abutting against the conveyor belt, a scraping gap is provided on the scraping surface, and in a case where the scraping plate drives the scraping surface to move and scrape the surface of the conveyor belt, the impurities scraped off are separated from the scraping gap. Thus, the reciprocating screw rod is used to drive the drive block to move, so that the scraping plate moves, and the limiting slide rod is used to limit a movement direction of the drive block, so as to implement the scraping action.

In some embodiments, the cleaning mechanism further includes a transmission unit, where the transmission unit includes:
  a drive apparatus, where the drive apparatus is arranged on the water collection frame, and an output end of the drive apparatus is connected to the cleaning roller;
  synchronous wheels, where the synchronous wheels are coaxially arranged on the cleaning rollers;
  a driven wheel, where the driven wheel is coaxially arranged on the reciprocating screw rod; and a synchronous belt, where the synchronous belt is in transmission connection to the synchronous wheel and the driven wheel.

The drive apparatus drives the cleaning roller to rotate, so as to enable the synchronous belt to drive the synchronous wheel and the driven wheel to rotate, and the reciprocating screw rod drives the scraping plate to move the surface of the conveyor belt after rotating.

The synchronous belt is in transmission connection to two adjacent synchronous wheels, the driven wheel is arranged between the two adjacent synchronous wheels, and the synchronous belt drives the driven wheel to rotate through engagement between a gear and a rack. Thus, the drive apparatus is used to provide a power source, and thus the synchronous wheel, the driven wheel, and the synchronous belt drive other components to move.

In some embodiments, the transmission unit further includes pressing plates arranged on the water collection frame, and the pressing plates abut against two sides of the synchronous belt, so as to enable the synchronous belt to be attached to the synchronous wheels and the driven wheel. Thus, the pressing plate is used to keep the effectiveness of power transmission by the synchronous belt and avoid transmission disengagement.

In some embodiments, the cleaning mechanism further includes a flushing unit arranged on the water collection frame; and the flushing unit includes:
a first flusher, where the first flusher is provided with a plurality of spraying nozzles used to spray a cleaning liquid;
a second flusher, where the second flusher is provided with a plurality of spraying nozzles used to spray a flushing liquid; and
a pressurization apparatus, where an output end of the pressurization apparatus is connected to the first flusher and the second flusher, and pressurizes the first flusher and the second flusher, so as to perform a spraying operation.

In the conveying direction of the conveyor belt, the first flusher and the second flusher are arranged on an upstream side of the cleaning rollers in sequence. Thus, the first flusher and the second flusher implement a spray-flushing effect through the pressurization apparatus, and the conveyor belt is first sprayed and flushed, and then enters a scraping and cleaning process, so as to improve cleaning effectiveness.

In some embodiments, the flushing unit further includes a water baffle, the water baffle is provided with a cambered wall surface, so as to enclose two sides of the first flusher and prevent the cleaning liquid of the first flusher from entering the conveyor belt from the two sides. Thus, the water baffle is used to prevent the cleaning liquid from entering an output side of the conveyor belt and avoid contaminating goods to be conveyed.

In some embodiments, the water collection frame is provided with an exhaust fan used to drive hot airflow, a direction of the airflow generated by the exhaust fan faces the conveyor belt, and in the conveying direction of the conveyor belt, the exhaust fan is arranged on a downstream side of the cleaning roller.

The water collection frame is provided with a water outlet hole, and a bottom of the water collection frame is dented and gathered at the water outlet hole. Thus, the exhaust fan is used to dry the conveyor belt, so as to keep the conveyor belt dry and clean before conveying. Through the water outlet hole, the impurities are discharged from the water collection frame and recycled conveniently.

In some embodiments, in the conveying direction of the conveyor belt, the conveyor belt is dented from two sides to a middle of the conveyor belt, so as to form a recess used for conveying, and the cleaning roller protrudes from two sides to a middle of the cleaning roller, so as to abut against the recess. Thus, the recess may convey the goods, and prevent the goods from falling to the outside.

In some embodiments, the support rack is provided with a limiting roller, and the limiting roller abuts against the surface of the conveyor belt obliquely, so as to form the recess by the conveyor belt.

Two sides of the conveyor roller are provided with abutment bevels, a degree of inclination of the abutment bevel is identical to a degree of inclination of the limiting roller, and the conveyor belt is stressed between the abutment bevel and the limiting roller.

Thus, the conveyor belt is limited by the limiting roller and the abutment bevel, so as to maintain effectiveness of the recess.

Compared with the prior art, the transport equipment with cleaning capabilities of the present disclosure has the beneficial effects as follows:

According to the present disclosure, during conveying, surface cleaning treatment can be performed on the conveyor belt through the cleaning mechanism. The cleaning mechanism is integrated on one side of the support rack, so as not to interfere with the support rack or other components. The cleaning mechanism may execute repeated and alternate cleaning actions and scraping actions on the conveyor belt simultaneously. Thus, repeated cleaning and scraping can ensure the cleaning effectiveness of the conveyor belt, and cleanliness and hygiene of the conveyor belt in use can be improved. The removed impurities are collected in the cleaning mechanism and prevented from falling on the support rack, and thus the addition of residual impurities is unlikely.

In the figures: 1—support rack, 11—support leg, 12—limiting roller, 2—conveyor roller, 21—abutment bevel, 3—conveyor belt, 31—recess, 4—cleaning mechanism, 41—water collection frame, 411—water outlet, 412—external connection frame, 413—exhaust fan, 421—first flusher, 422—second flusher, 423—pressurization pump, 424—water baffle, 431—reciprocating screw rod, 432—limiting slide rod, 433—drive block, 434—scraping plate, 435—scraping surface, 436—scraping gap, 44—cleaning roller, 451—drive apparatus, 452—synchronous wheel, 453—driven wheel, 454—synchronous belt, and 455—pressing plate.

DETAILED DESCRIPTION OF THE INVENTION

In order to make the objectives, technical solution, and advantages in examples of the present disclosure clearer, the technical solution in the examples of the present disclosure is clearly and completely described below with reference to the accompanying drawings in the examples of the present disclosure. Apparently, the examples described are some examples rather than all examples of the present disclosure. All other examples derived by those of ordinary skill in art based on the examples of the present disclosure without creative efforts fall within the scope of protection of the present disclosure.

It should be noted that the terms "first" and "second" are merely for description, and cannot be interpreted as indicating or implying relative importance or implicitly indicating a number of technical features indicated. Thus, features defined by "first" and "second" can explicitly or implicitly include at least one of such a feature. In the description of the present disclosure, the term "a plurality of" indicates at least two, such as two and three, unless definitely and specifically defined otherwise.

The present disclosure relates to a transport equipment with cleaning capabilities, which is applicable to the field of food processing and conveying technologies, and in particular to a distilled grain preparation technology. The transport equipment has a normal conveying function and a cleaning function, and thus can ensure cleanliness during food processing when in use.

The present disclosure will be further described in detail below with reference to the accompanying drawings.

Figure 1:
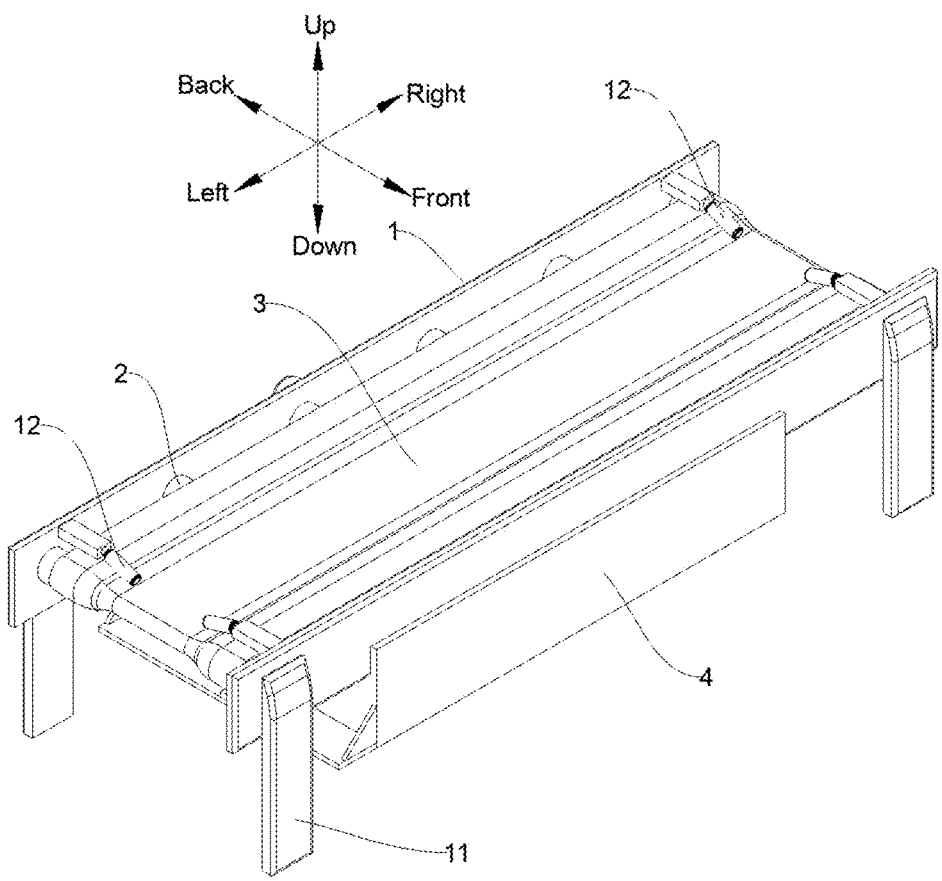
FIG. 1 is a schematic structural diagram of a transport equipment with cleaning capabilities according to the present disclosure.

FIG. 1 illustratively shows a transport equipment with cleaning capabilities according to an embodiment of the present disclosure. As shown in FIG. 1, with one side towards which a gravity direction is directed as a lower side and an opposite side as an upper side, a length direction of the transport equipment with cleaning capabilities as a left-right direction, and a width direction of the transport equipment with cleaning capabilities as a front-rear direction, the transport equipment with cleaning capabilities includes a support rack 1, a conveyor belt 3, and a cleaning mechanism 4.

The support rack 1 is of a rectangular frame structure and is used to support other components. The support rack 1 may be composed of a welded frame. Bottom ends of the support rack 1 are provided with four support legs 11 for supporting. The support legs 11 may be placed on a horizontal placement surface and may be of a fixed structure or a movable structure. For example, universal slide wheels are arranged on the support legs 11, so as to facilitate movement to other positions. A hollow structure is arranged in the support rack 1, and used to rotatably arrange conveyor rollers 2. A plurality of conveyor rollers 2 are preferably arranged in a length direction of the support rack 1. An axial direction of the conveyor rollers 2 extends in a width direction. The conveyor rollers 2 are specifically electric conveyor rollers that may be driven to provide power for conveying goods after being energized. The conveyor belt 3 sleeves the conveyor roller 2, so that the conveyor roller 2 may drive the conveyor belt 3 to move.

Figure 2:
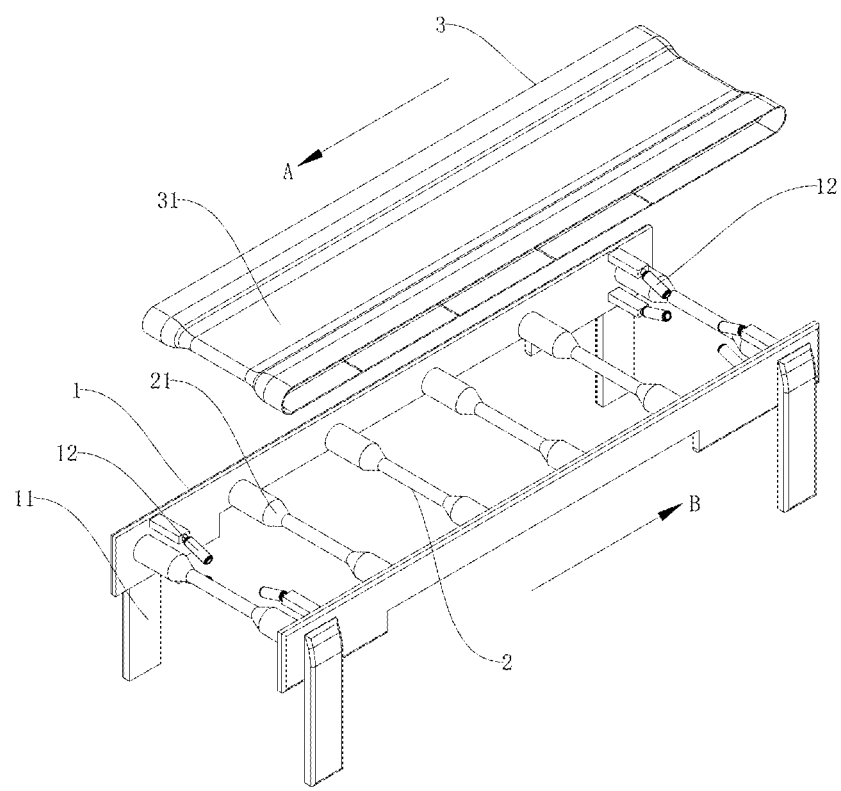
FIG. 2 is an exploded structural diagram of a support rack and a conveyor belt according to the present disclosure.

As shown in FIG. 2, under the driving by the conveyor roller 2, the conveyor belt 3 may rotate for conveying in the length direction. Since the conveyor belt 3 is rotatable circulative, goods may be conveyed on the conveyor belt 3. In the example, a conveying direction on an upper side of the conveyor belt 3 is a conveying direction A (a leftward direction), i.e. a conveying direction of the goods. A conveying direction on a lower side of the conveyor belt 3 is a conveying direction B (a rightward direction), i.e. a return direction after the conveyor belt 3 conveys the goods. Further, since the goods to be conveyed (such as distilled grains) may be in a form of a liquid, in order to ensure conveying effectiveness, the conveyor belt 3 is provided with recesses 31. The recesses 31 are of a dented structure formed on the conveyor belt 3. In the conveying direction A, the conveyor belt 3 is dented from two sides in the width direction to the middle of the conveyor belt, so as to form the recesses 31 used to convey the goods. When viewed laterally, the recesses 31 are distributed on the upper side and the lower side of the conveyor belt 3. Through the recesses 31, the conveyor belt 3 is formed into a structure with two sides higher than the middle, i.e. with a height of a front side and a rear side greater than that of the middle. A middle portion of the conveyor belt 3 is still flat, so that the goods may be limited when conveyed.

Figure 3:
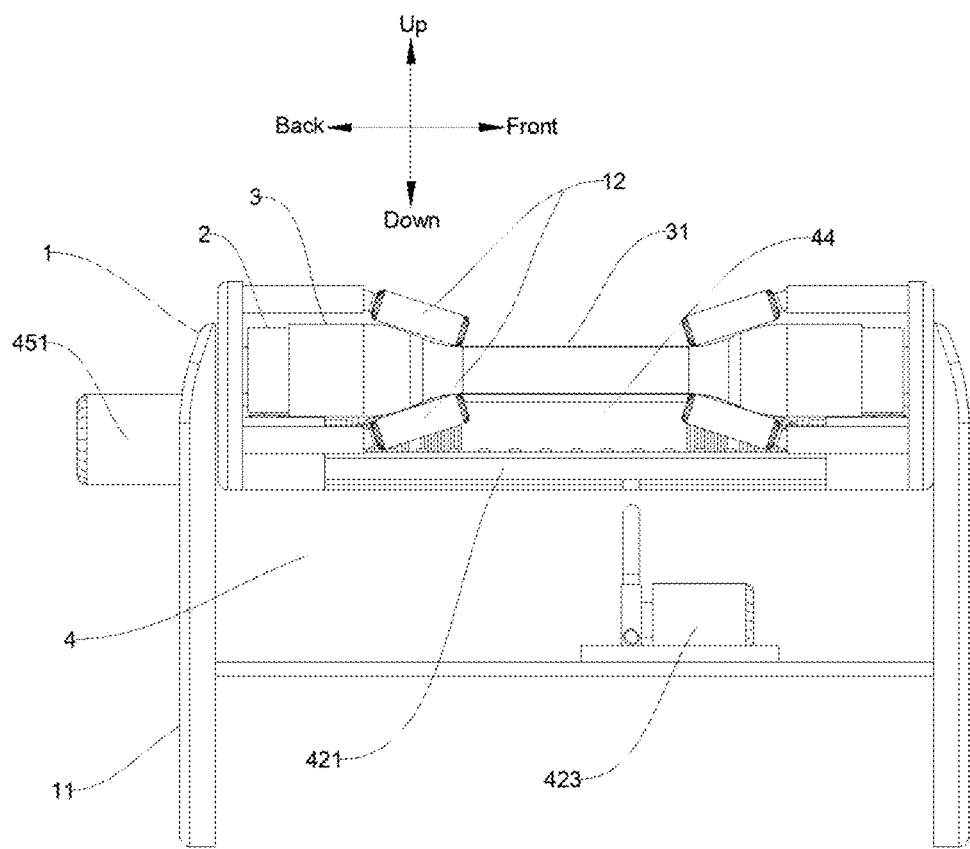
FIG. 3 is a side view of a transport equipment with cleaning capabilities according to the present disclosure.

Specifically, as shown in FIG. 3, the recess 31 is defined by structures of limiting rollers 12 and the conveyor rollers 2. The limiting rollers 12 are rotatably arranged on the support rack 1 and symmetrically arranged in the up-down direction and the front-rear direction. The limiting rollers 12 are obliquely arranged on the support rack 1. To be specific, an axis of the limiting rollers 12 intersects with an axial direction of the conveyor rollers 2. In order to adapt to a shape of the conveyor belt 3, the conveyor roller 2 is also of a structure with two sides wider than a middle, and a diameter of a middle portion of the conveyor roller 2 is less than that of the two sides of the conveyor roller. Further, the conveyor roller 2 is further provided with abutment bevels 21. The abutment bevels 21 are symmetrically arranged on the two sides in the front-rear direction. A degree of inclination of the abutment bevels 21 is identical to a degree of inclination of the limiting roller 12, and the limiting roller 12 is closer to the abutment bevel 21. When the conveyor belt 3 sleeves the conveyor rollers 2, an inner side surface of the conveyor belt 3 makes contact with the abutment bevels 21. Moreover, the limiting rollers 12 on the upper side and the lower side may cooperate with the abutment bevels 21, so as to define the conveyor belt 3. The limiting rollers 12 on the left side and the right side perform symmetric definition. Thus, the conveyor belt 3 is stressed between the abutment bevels 21 and the limiting rollers 12. In this way, the conveyor belt 3 is dented towards the middle to form the recess 31. When conveyed through the recess 31, the goods can be effectively prevented from falling off the conveyor belt 3, and conveying effectiveness of the conveyor belt 3 can be improved.

Figure 4:
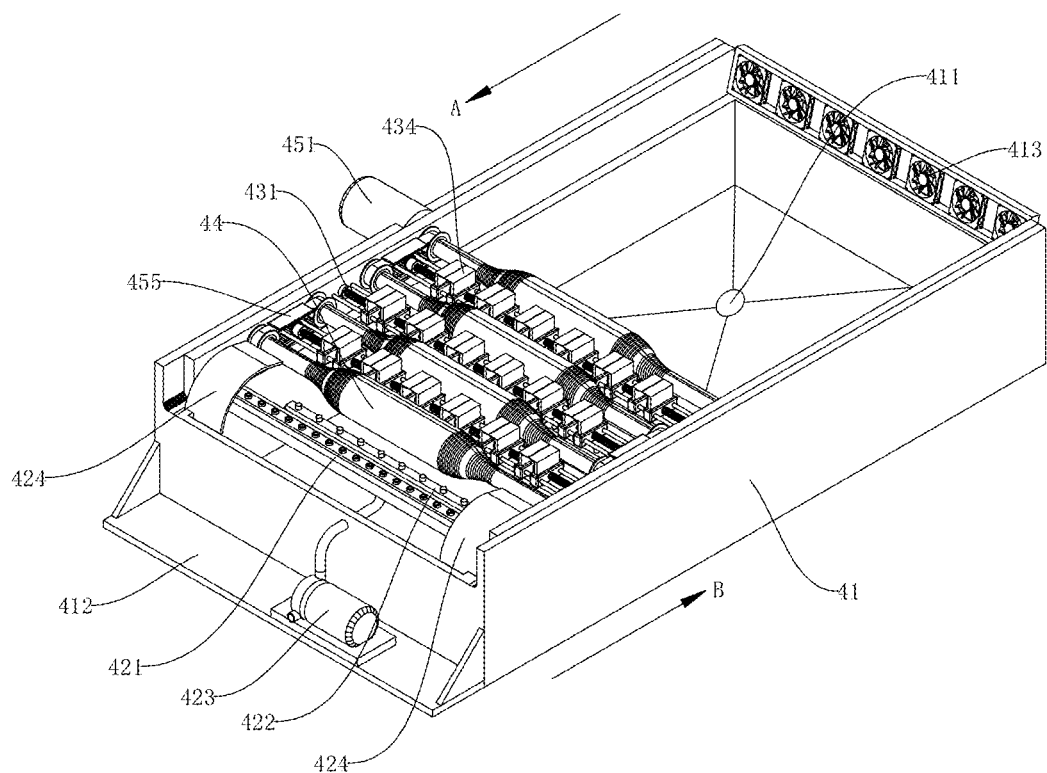
FIG. 4 is a schematic structural diagram of a cleaning mechanism according to the present disclosure.

As shown in FIG. 4, the cleaning mechanism 4 is used to clean the conveyor belt 3 during conveying and may execute repeated and alternate cleaning actions and scraping actions on the conveyor belt 3 simultaneously. The cleaning mechanism 4 is integrally arranged on the lower side (the bottom) of the support rack 1 and is unlikely to interfere with other conveying components. Specifically, the cleaning mechanism 4 includes a water collection frame 41, a flushing unit, a scraping apparatus, a cleaning roller 44, and a transmission unit.

The water collection frame 41 is a frame body having a hollow structure inside and is used to collect strains or impurities (such as impurities formed by the distilled grains and rice) removed from the conveyor belt 3. The water collection frame 41 may be fixedly connected or detachably connected to the bottom of the support rack 1. The flushing unit, the scraping apparatus, the cleaning roller 44, and the transmission unit are integrally arranged on the water collection frame 41. The above mechanisms are mainly located on a left side of the water collection frame 41, and a right side of the water collection frame 41 is of an opened structure for cleaning and inspecting an internal situation. A bottom of the water collection frame 41 is provided with a water outlet 411. Preferably, the bottom of the water collection frame 41 is dented and gathered at the water outlet 411, so that impurities collected in the water collection frame 41 may be discharged through the water outlet 411 under the action of gravity. A guide pipe is generally connected to an outer side of the water outlet 411, so as to facilitate drainage to the outside or recycling of the impurities.

As shown in FIG. 4, the flushing unit is used to flush the conveyor belt 3, which is a first procedure in a process of cleaning the conveyor belt 3. The flushing unit is located on a leftmost side of the water collection frame 41, and includes a first flusher 421, a second flusher 422, a pressurization apparatus, and a water baffle 424. The first flusher 421 and the second flusher 422 extend in the width direction, and are provided with a plurality of spraying nozzles separately. The spraying nozzles face the upper side, so as to directly act on the conveyor belt 3. Specifically, the pressurization apparatus is a pressurization pump 423. An external connection frame 412 extends from the left side of the water collection frame 41, and the pressurization pump 423 is mounted on the external connection frame 412. An output end of the pressurization pump 423 is connected to the first flusher 421 and the second flusher 422. The first flusher 421 is connected to a storage tank for a cleaning liquid, and the second flusher 422 is connected to a storage tank for clean water. When the pressurization pump 423 starts to operate, the first flusher 421 may be pressurized and driven to spray the cleaning liquid onto the conveyor belt 3, and the second flusher 422 may be driven to spray the clean water upwards to flush the conveyor belt 3. In the conveying direction B, the first flusher 421 is located on an upstream side of the second flusher 422, and the second flusher 422 is located on an upstream side of the cleaning roller 44. Thus, the conveyor belt 3 passes through the first flusher 421, the second flusher 422, and the cleaning roller 44 in sequence, so as to complete a cleaning operation step by step. Two water baffles 424 may be provided, and fixedly and hermetically arranged on an inner side wall of the water collection frame 41 separately, so that the first flusher 421 and the second flusher 422 are exposed between the water baffles 424. The water baffle 424 is provided with a cambered wall surface to form a hollow structure inside, so as to enclose two sides of the first flusher 421 or the second flusher 422. Thus, the first flusher 421 and the second flusher 422 directly act on the surface of the conveyor belt 3. The water baffle 424 prevents the cleaning liquid of the first flusher 421 from entering the conveyor belt 3 from the front side and the rear side, thereby avoiding contaminating the distilled grains. Thus, the hygiene of the conveyor belt 3 during conveying is improved.

The cleaning rollers 44 are rotatably arranged on the water collection frame 41, and used to abut against the surface of the conveyor belt 3 and clean the surface of the conveyor belt 3 through rolling. An axis of the cleaning rollers 44 extends in the width direction. A plurality of cleaning rollers 44 are provided to execute repeated cleaning actions on the conveyor belt 3. Four cleaning rollers 44 are evenly arranged in the conveying direction B in the example. In order to adapt to a structure of the recess 31 of the conveyor belt 3, the cleaning roller 44 is of a structure with two sides narrower than a middle, i.e. with a diameter of the two sides of the cleaning roller 44 less than that of the middle of the cleaning roller. Thus, the cleaning roller 44 is formed into a protruding structure, and an axial length of the middle of the cleaning roller 44 is adapted to a width size of the recess 31. Preferably, when undergoing a last scraping action, the conveyor belt 3 needs to be re-cleaned by the cleaning roller 44. To be specific, the cleaning action of the cleaning roller 44 is taken as the final surface contact treatment. In the example, after the conveyor belt 3 is sprayed with the liquid, the cleaning roller 44 first takes an action. After alternate removal, the cleaning action is ended by the cleaning roller 44 subsequently, so that cleanliness of the conveyor belt 3 is ensured. The cleaning roller 44 is rotated mainly through the transmission unit.

Figure 5:
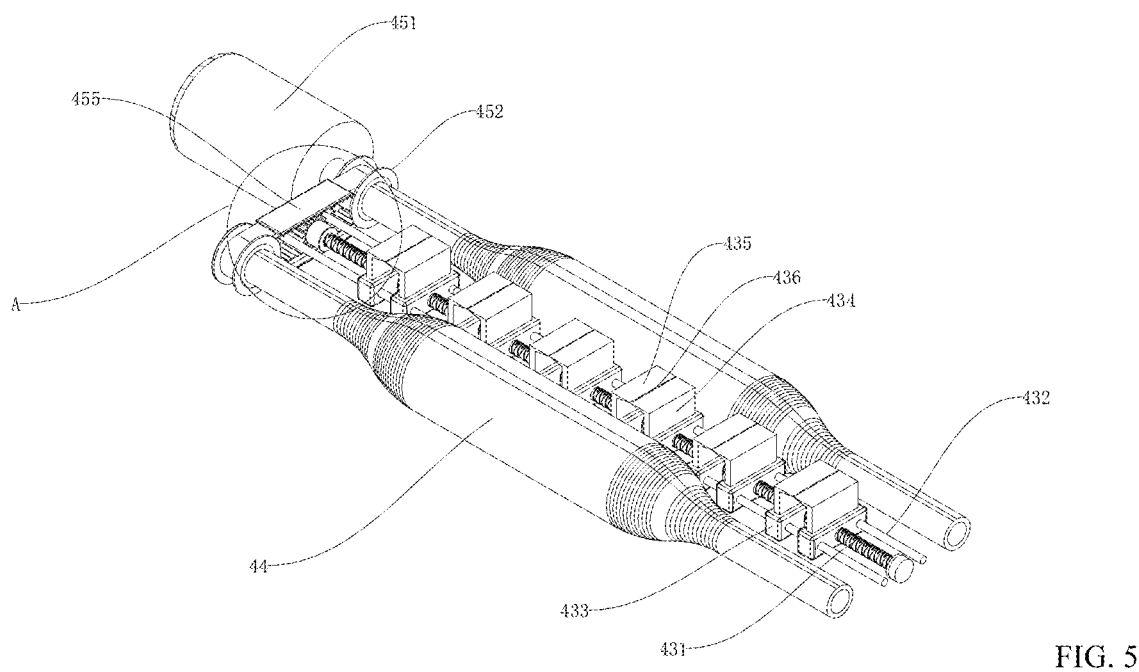
FIG. 5 is a schematic diagram of a combination of a transmission unit, a scraping unit, and a cleaning roller according to the present disclosure.
Figure 6:
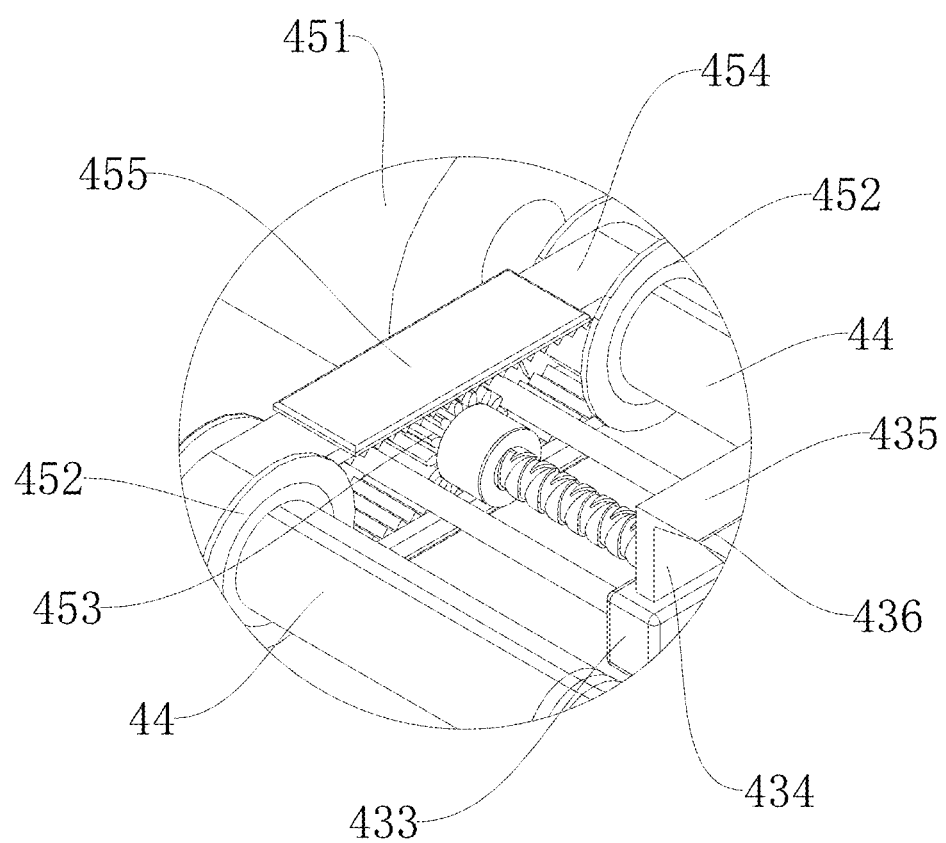
FIG. 6 is an enlarged view of a portion "A" in FIG. 5.

As shown in FIGS. 5 and 6, the transmission unit is used to provide power for the cleaning roller 44 and the scraping apparatus to operate. The transmission unit includes a drive apparatus 451, synchronous wheels 452, a driven wheel 453, a synchronous belt 454, and pressing plates 455. The drive apparatus 451 is arranged on one side of the water collection frame 41, and is used to provide a power source of the transmission unit. Specifically, the drive apparatus 451 is a drive motor. An output end of the drive apparatus 451 is connected to the cleaning roller 44, so that the cleaning roller 44 is driven to rotate. The synchronous wheel 452 is coaxially arranged on the cleaning roller 44. Two synchronous wheels 452 are arranged on each of two ends of a single cleaning roller 44. The synchronous belt 454 is in transmission connection to two adjacent synchronous wheels 452. When the cleaning roller 44 rotates, the synchronous belt 454 may be driven to rotate through the synchronous wheels 452, and the synchronous belt 454 drives the other cleaning roller 44 to rotate. Two adjacent cleaning rollers 44 are driven through at least one synchronous belt 454, so that all the cleaning rollers 44 rotate. Being arranged inside the synchronous belt 454, the driven wheel 453 is preferably of a gear structure, and may be driven by the synchronous belt 454 to rotate through engagement between a gear and a rack. The driven wheel 453 is used to drive the scraping apparatus to move, so as to execute the scraping action. The pressing plate 455 is arranged on the inner side wall of the water collection frame 41, and is of a blocky plate structure. The pressing plate extends in a width direction of the pressing plate, so as to cover a part of the synchronous belt 454. The pressing plate 455 abuts against an upper side and a lower side of the synchronous belt 454. To be specific, two pressing plates 455 cooperate with one synchronous belt 454. The pressing plate 455 is used for abutment and limiting outward expansion of the synchronous belt 454. Thus, the synchronous belt 454 may keep in contact with the synchronous wheel 452 and the driven wheel 453 for attachment or engagement continuously. Accordingly, effectiveness of power transmission by the transmission unit is improved, and the synchronous belt 454 is unlikely to be disengaged or to be slipped during transmission. In some embodiments, a thickness of the pressing plate 455 may be appropriately increased or a movable or detachable structure may be provided. Thus, the pressing plate 455 may adjust tightness of the synchronous belt 454 when abutting against the synchronous belt 454.

As shown in FIGS. 5 and 6, the scraping apparatuses are used to execute the scraping action on the surface of the conveyor belt 3. A plurality of scraping apparatuses are evenly arranged in the conveying direction B, so as to implement the repeated scraping actions on the conveyor belt 3. In the conveying direction B, the scraping apparatuses and the cleaning rollers 44 are arranged adjacent to each other and distributed alternately (in a staggered and spaced manner). Thus, the cleaning actions and the scraping actions are alternately performed on the conveyor belt 3. Specifically, the scraping apparatus includes a reciprocating screw rod 431, a limiting slide rod 432, and a drive block 433. The reciprocating screw rod 431 is provided with a threaded structure, and rotatably arranged on the water collection frame 41. The driven wheel 453 is coaxially mounted at a shaft end of the reciprocating screw rod 431. The reciprocating screw rod 431 is driven to rotate through rotation of the driven wheel 453. The limiting slide rods 432 are of slide rod structures fixedly arranged on the inner wall of the water collection frame 41. Two limiting slide rods 432 are arranged adjacent to each other on two sides of the reciprocating screw rod 431. The limiting slide rods 432 are used to define and guide the drive blocks 433, and the limiting slide rods 432 are connected to the drive blocks 433 through shaft-hole cooperation. The drive blocks 433 are of a block structure. A plurality of drive blocks 433 are arranged in an axial direction (a width direction) of the reciprocating screw rod 431, and the drive blocks 433 are movably arranged on the reciprocating screw rod 431. The drive blocks 433 are provided with threaded through holes, so as to perform threaded-screw rod cooperation with the reciprocating screw rod 431 through the threaded through holes. The drive blocks 433 are further provided with through hole structures, so as to slidably cooperate with the limiting slide rods 432. In addition, each drive block 433 is provided with a scraping plate 434. The scraping plate 434 is of a right-angled n-shaped structure, and is used to scrape off impurities on the surface of the conveyor belt 3. An upper side of the scraping plate 434 is provided with a scraping surface 435, and the scraping surface 435 may be a flat surface or a bevel. A scraping gap 436 is provided on the scraping surface 435. The scraping gap 436 is of a hollow structure, so as to divide the scraping surface 435 into two surfaces.

When in use, the synchronous belt 454 drives the driven wheel 453 to rotate, and the driven wheel 453 drives the reciprocating screw rod 431 to rotate, so that the drive block 433 moves along the limiting slide rod 432 and the reciprocating screw rod 431. The scraping surface 435 may abut against the surface of the conveyor belt 3, the scraping surface 435 of the scraping plate 434 is driven by the drive block 433 to execute the scraping action on the conveyor belt 3, and thus the impurities on the conveyor belt 3 may fall from the scraping gap 436 and is unlikely to adhere to the scraping plate 434. Through reciprocating movement of the plurality of scraping plates 434 on the conveyor belt 3, the impurities on the upper surface of the conveyor belt 3 is effectively scraped off, so that cleanliness is improved.

Further, as shown in FIG. 4, the water collection frame 41 is provided with exhaust fans 413 used to drive hot airflow. A plurality of exhaust fans 413 are arranged in the width direction. The exhaust fans 413 are closer to a right edge of the water collection frame 41. To be specific, the exhaust fans 413 are arranged on the downstream side of the cleaning roller 44 in the conveying direction B. Thus, the conveyor belt 3 is dried by the exhaust fans 413 after undergoing the cleaning action by the cleaning roller 44 and the scraping action by the scraping apparatus. Preferably, the exhaust fan 413 may drive the hot airflow towards the conveyor belt 3. The exhaust fan 413 may be a heating fan, a drive fan with a heater, etc. A flowing direction of the airflow driven by the exhaust fan 413 faces the conveyor belt 3. Thus, the conveyor belt 3 can be dried rapidly when passing through the exhaust fan, dryness the conveyor belt 3 before conveying can be ensured, and cleanliness of the conveyor belt 3 can be facilitated.

Operation principle: with one-time circulation of the conveyor belt 3 as an example, the conveyor roller 2 is activated to drive the conveyor belt 3 for conveying, the upper side (the recess 31) of the conveyor belt 3 can convey the goods (such as the distilled grains) in the conveying direction A. The lower side of the conveyor belt 3, a return circulation portion, can be cleaned and scraped by the cleaning mechanism 4. In the conveying direction B, the conveyor belt 3 first passes through the first flusher 421 and the second flusher 422 in sequence. Under the action of pressure of the pressurization pump, the first flusher 421 sprays the cleaning liquid to the conveyor belt 3, and the second flusher 422 flushes the conveyor belt 3. The drive apparatus 451 is activated to rotate the cleaning roller 44, the cleaning roller 44 drives the reciprocating screw rod 431 to rotate through cooperation between the synchronous belt 454 and the driven wheel 453, so as to move the scraping plate 434. The conveyor belt 3 simultaneously undergoes the repeated and alternate cleaning actions and scraping actions through the cleaning roller 44 and the scraping plate 434 respectively. The impurities on the surface of the conveyor belt 3 are removed and collected in the water collection frame 41. Finally, the conveyor belt 3 is dried under the action of the exhaust fan 413, and enters a next circulation.

What is described above is merely the preferred example of the present disclosure. For the sake of concise description, not all possible combinations of technical features in the above example are described, but which is not intended to limit the present disclosure in any form. Any variation, equivalent change, and modification made to the above example according to the technical essence of the present disclosure without departing from the contents of the technical solution of the present disclosure still fall within the scope of the technical solution of the present disclosure.

The invention claimed is:

1. A transport equipment with cleaning capabilities, comprising:
   a support rack, wherein conveyor rollers are rotatably arranged on the support rack;
   a conveyor belt arranged around the conveyor rollers and driven thereby for conveying; and
   a cleaning mechanism integrally arranged on one side of the support rack; wherein
   in a single circulative conveying of the conveyor belt, the cleaning mechanism simultaneously performs repeated and alternate cleaning actions and scraping actions on the conveyor belt, with impurities removed from the conveyor belt collected in the cleaning mechanism;
   the cleaning mechanism comprising:
   a water collection frame arranged on one side of the support rack;
   a plurality of scraping apparatuses arranged on the water collection frame for scraping a surface of the conveyor belt; and
   a plurality of cleaning rollers rotatably arranged on the water collection frame and abutting against the conveyor belt to clean the surface of the conveyor belt in a rolling manner; wherein
   along the conveyor belt's conveying direction, the plurality of scraping apparatuses and the cleaning rollers are arranged adjacent to each other and distributed alternately, with the impurities removed from the conveyor belt by the scraping apparatuses and the cleaning rollers collected in the water collection frame;
   each scraping apparatus comprising:
   a reciprocating screw rod rotatably arranged on the water collection frame;
   a limiting slide rod arranged on the water collection frame and adjacent to the reciprocating screw rod; and a plurality of drive blocks movably arranged on the reciprocating screw rod and the limiting slide rod, and provided with scraping plates; wherein rotation of the reciprocating screw rod drives the drive blocks to move along the limiting slide rod, enabling the scraping plate to scrape the surface of the conveyor belt;

a movement direction of the scraping plate is perpendicular to the conveying direction of the conveyor belt; and the scraping plate is provided with a scraping surface abutting against the conveyor belt, with a scraping gap formed on the scraping surface, and in a case where the scraping plate drives the scraping surface to move and scrape the surface of the conveyor belt, the impurities scraped off are separated from the scraping gap; and the cleaning mechanism further comprising a transmission unit with:

a drive apparatus arranged on the water collection frame, and an output end of the drive apparatus connected to the cleaning roller;

synchronous wheels coaxially arranged on the cleaning rollers;

a driven wheel coaxially arranged on the reciprocating screw rod; and a synchronous belt in transmission connection to the synchronous wheel and the driven wheel; wherein the drive apparatus drives the cleaning roller to rotate, enabling the synchronous belt to rotate the synchronous wheel and the driven wheel, and the reciprocating screw rod drives the scraping plate to move the surface of the conveyor belt after rotating.

2. The transport equipment with cleaning capabilities according to claim 1, wherein the synchronous belt is in transmission connection to two adjacent synchronous wheels, the driven wheel is arranged between the two adjacent synchronous wheels, and the synchronous belt drives the driven wheel to rotate through engagement between a gear and a rack.

3. The transport equipment with cleaning capabilities according to claim 1, wherein the transmission unit further comprises pressing plates arranged on the water collection frame, the said pressing plates abutting against both sides of the synchronous belt, enabling the synchronous belt to be attached to the synchronous wheels and the driven wheel.

4. The transport equipment with cleaning capabilities according to claim 1, wherein the cleaning mechanism further comprises a flushing unit arranged on the water collection frame, the said flushing unit comprising:

a first flusher provided with a plurality of spraying nozzles for spraying a cleaning liquid;

a second flusher provided with a plurality of spraying nozzles for spraying a flushing liquid; and a pressurization apparatus with an output end connected to the first flusher and the second flusher, pressurizing them to perform spraying operations; wherein in the conveying direction of the conveyor belt, the first flusher and the second flusher are arranged on an upstream side of the cleaning rollers in sequence.

5. The transport equipment with cleaning capabilities according to claim 4, wherein the flushing unit further comprises a water baffle having a cambered wall surface, so as to enclose two sides of the first flusher and prevent the cleaning liquid of the first flusher from entering the conveyor belt from the two sides.

6. The transport equipment with cleaning capabilities according to claim 1, wherein the water collection frame is provided with an exhaust fan used to generate hot airflow directed toward the conveyor belt, and in the conveying direction of the conveyor belt, the exhaust fan is arranged on a downstream side of the cleaning rollers; and the water collection frame is provided with a water outlet hole, and a bottom of the water collection frame is dented and gathered at the water outlet hole.

7. The transport equipment with cleaning capabilities according to claim 1, wherein in the conveying direction of the conveyor belt, the conveyor belt is concaved from both sides toward its central portion, so as to form a recess used for conveying, and the cleaning roller protrudes from two sides to a middle of the cleaning roller, so as to abut against the recess.

8. The transport equipment with cleaning capabilities according to claim 7, wherein the support rack is provided with a limiting roller, and the limiting roller abuts against the surface of the conveyor belt obliquely, so as to form the recess by the conveyor belt; and two sides of the conveyor roller are provided with abutment bevels, a degree of inclination of the abutment bevel is identical to a degree of inclination of the limiting roller, and the conveyor belt is stressed between the abutment bevel and the limiting roller.

\* \* \* \* \*